(12) United States Patent
Son et al.

(10) Patent No.: US 12,269,383 B2
(45) Date of Patent: Apr. 8, 2025

(54) VENTILATION AND HEATING APPARATUS FOR CHILD SEAT

(71) Applicants: Hyundai Motor Company, Seoul (KR); Kia Corporation, Seoul (KR); Poled Co., Ltd., Chungcheongnam-do (KR)

(72) Inventors: Byeong Seon Son, Seoul (KR); Tae Hoon Lee, Gyeonggi-do (KR); Seung Hyun Kim, Daejeon (KR); Ji Hwan Kim, Seoul (KR); Seon Chae Na, Gyeonggi-do (KR); Sang Ho Kim, Incheon (KR); Sang Hoon Park, Incheon (KR); Jeong In Baek, Gyeonggi-do (KR); Yong Chul Jang, Gyeonggi-do (KR); In Ju Lee, Seoul (KR)

(73) Assignees: Hyundai Motor Company, Seoul (KR); Kia Corporation, Seoul (KR); Poled Co., Ltd., Chungcheongnam-do (KR)

(*) Notice: Subject to any disclaimer, the term of this patent is extended or adjusted under 35 U.S.C. 154(b) by 94 days.

(21) Appl. No.: 18/080,488

(22) Filed: Dec. 13, 2022

(65) Prior Publication Data
US 2023/0356635 A1 Nov. 9, 2023

(30) Foreign Application Priority Data
May 3, 2022 (KR) .................. 10-2022-0054527

(51) Int. Cl.
*B60N 2/56* (2006.01)
*B60N 2/28* (2006.01)

(52) U.S. Cl.
CPC ......... *B60N 2/5657* (2013.01); *B60N 2/2881* (2013.01); *B60N 2/5635* (2013.01); *B60N 2/2821* (2013.01); *B60N 2/5685* (2013.01)

(58) Field of Classification Search
CPC .................................................. B60N 2/5657
See application file for complete search history.

(56) References Cited

U.S. PATENT DOCUMENTS

| 3,957,304 | A | 5/1976 | Koutsky et al. |
| 5,015,010 | A | 5/1991 | Homeier et al. |
| 8,485,600 | B2 | 7/2013 | Forsman et al. |
| 10,640,019 | B1 | 5/2020 | St. Onge |
| 2008/0054695 | A1 | 3/2008 | Lhomme et al. |

(Continued)

FOREIGN PATENT DOCUMENTS

| CN | 108116278 A | * | 6/2018 | ............... B60N 2/26 |
| CN | 108515888 A | * | 9/2018 | ............... B60N 2/26 |

(Continued)

*Primary Examiner* — Timothy J Brindley
(74) *Attorney, Agent, or Firm* — Fox Rothschild LLP

(57) ABSTRACT

A ventilation and heating apparatus for a child seat is provided. A ventilation mat with an embedded heating wire is mounted on a body of the child seat, so ventilation air is discharged toward a child's body through the ventilation mat in summer or when ventilation is required, and heating wire embedded in the ventilation mat is driven in winter, thus providing a comfortable seating environment for a child sitting on the child seat, and improving the sitting comfort of a child.

16 Claims, 6 Drawing Sheets

(56) References Cited

U.S. PATENT DOCUMENTS

| | | | |
|---|---|---|---|
| 2010/0295339 A1* | 11/2010 | Siu | B60N 2/5635 |
| | | | 297/180.14 |
| 2015/0061331 A1 | 3/2015 | Yang | |
| 2021/0008955 A1* | 1/2021 | Dry | B60N 2/5657 |
| 2021/0268945 A1* | 9/2021 | Cook | B60N 2/26 |
| 2021/0323443 A1* | 10/2021 | Ozawa | B60N 2/5628 |
| 2023/0294574 A1* | 9/2023 | Son | B60N 2/067 |

FOREIGN PATENT DOCUMENTS

| | | | | |
|---|---|---|---|---|
| CN | 108544993 A | * | 9/2018 | B60N 2/26 |
| DE | 202011050088 U1 | * | 9/2011 | A47C 7/744 |
| DE | 102021200211 A1 | * | 7/2022 | |
| EP | 1791720 B1 | | 6/2007 | |
| EP | 3677469 A1 | * | 7/2020 | B60N 2/26 |
| EP | 3822116 A1 | * | 5/2021 | B60N 2/002 |
| JP | 2019-073242 A | | 5/2019 | |
| KR | 101565107 B1 | * | 11/2015 | |
| KR | 101821146 B1 | * | 1/2018 | |
| KR | 10-2018-0035228 A | | 4/2018 | |
| KR | 101955964 B1 | * | 3/2019 | |
| KR | 10-2019-0133345 A | | 12/2019 | |
| KR | 10-2021-0089009 A | | 7/2021 | |
| KR | 10-2021-0120472 A | | 10/2021 | |
| KR | 10-2320519 B1 | | 11/2021 | |

\* cited by examiner

VENTILATION AND HEATING APPARATUS FOR CHILD SEAT

CROSS REFERENCE TO RELATED APPLICATION

The present application claims under 35 U.S.C. § 119(a) the benefit of Korean Patent Application No. 10-2022-0054527, filed May 3, 2022, the entire contents of which are incorporated herein for all purposes by this reference.

BACKGROUND

Technical Field

The present disclosure relates to a ventilation and heating apparatus for a child seat. More particularly, the present disclosure relates to a ventilation and heating apparatus for a child seat, in which a ventilation mat with an embedded heating wire is mounted on a body of the child seat, thus providing a comfortable seating environment for a child.

Background

Generally, as laws are enacted requiring that a child seat for a vehicle should be installed when a child rides in a vehicle, the supply of child seats is increasing.

However, a conventional manual child seat is problematic in that it is difficult to perform seat position adjustment and ventilation thereof, so a child refuses to sit or feels uncomfortable while sitting.

Moreover, when a child sits on a seat pad for the conventional child seat, a region of a child's body coining into contact with the seat pad is not ventilated efficiently, so the child feels uncomfortable, such as sweating.

Particularly, the conventional child seat is problematic in that it does not have a ventilation device for cooling and a heating device for heating, so a child riding in the child seat feels hot in summer, and feels cold in winter.

SUMMARY

Accordingly, the present disclosure has been made keeping in mind the above problems occurring in the related art, and an objective of the present disclosure is to provide a ventilation and heating apparatus for a child seat, in which a ventilation mat with an embedded heating wire is mounted on a body of the child seat, so ventilation air is discharged toward a child's body through the ventilation mat in summer or when ventilation is required, and heating wire embedded in the ventilation mat is driven in winter, thus providing a comfortable seating environment for a child sitting on the child seat, and improving the sitting comfort of a child.

The present disclosure provides a ventilation and heating apparatus for a child seat, the apparatus including a seat body made in a shape that allows a child to sit thereon; a ventilation mat made of a structure in which a heating wire is embedded in a ventilatable material, and attached to a sitting portion of the seat body; and a ventilation blower installed in the seat body to supply ventilation air to the ventilation mat.

Particularly, the ventilation mat may include a breathable mesh material layer of a predetermined thickness; a heating wire embedded in a front of the mesh material layer in a predetermined arrangement; and a vinyl layer coated on a surface of the mesh material layer. A plurality of air discharge holes may be formed in the vinyl layer coated on a front portion of the mesh material layer.

Preferably, the ventilation mat may be formed by integrating a back pad with which a child's upper body is in close contact and a cushion pad with which a child's lower body is in close contact.

More preferably, a buckle-avoiding cutout may be formed in a front end of the cushion pad of the ventilation mat to avoid interference with a buckle of the child seat.

In some embodiments, the buckle-avoiding cutout may be concavely formed in the front end of the cushion pad of the ventilation mat.

Further, a duct may be connected between a rear portion of the ventilation mat and the ventilation blower to deliver air from the ventilation blower to the ventilation mat. A duct fastening groove may be formed in a rear portion of the ventilation mat.

In some embodiments, a duct support hole through which the duct connected to a discharge part of the ventilation blower passes may be formed in a predetermined position on a front portion of the seat body.

Further, a base plate configured to make an inside of the seat body and outdoor air communicate with each other may be mounted on a bottom of the seat body. A grill may be formed on a side of the base plate to draw outdoor air.

In some embodiments, the base plate has an opening formed thereon to mount mechanism components for swiveling and reclining the seat body.

In some embodiments, a connector connected to a power supply so as to supply power to the heating wire and the ventilation blower may be mounted on a rear end of the base plate.

In some embodiments, the ventilation blower may be fixedly mounted on a frame installed in the seat body.

In some embodiments, a cover plate may be mounted on a rear surface of the seat body.

In some embodiments, the seat body may be injection-molded using a plastic material.

In one embodiment a vehicle comprising the ventilation and heating apparatus may be provided. The apparatus may be fixed on a rear seat of the vehicle.

As described above, the present disclosure provides the following effects.

First, a ventilation mat with an embedded heating wire is mounted on a body of a child seat, so ventilation air is discharged toward a child's body through the ventilation mat in summer or when ventilation is required, thus resolving discomfort such as sweating of a child's body or feeling hot and thereby providing a pleasant seating environment for a child.

Second, heating, wire embedded in a ventilation mat may be driven in winter, so it is possible to resolve discomfort of a child sitting on a child seat, such as feeling cold, thus providing a comfortable seating environment for a child.

BRIEF DESCRIPTION OF THE DRAWINGS

The above and other objectives, features, and other advantages of the present disclosure will be more clearly understood from the following detailed description when taken conjointly with the accompanying drawings, in which.

DETAILED DESCRIPTION

Figure 1A:
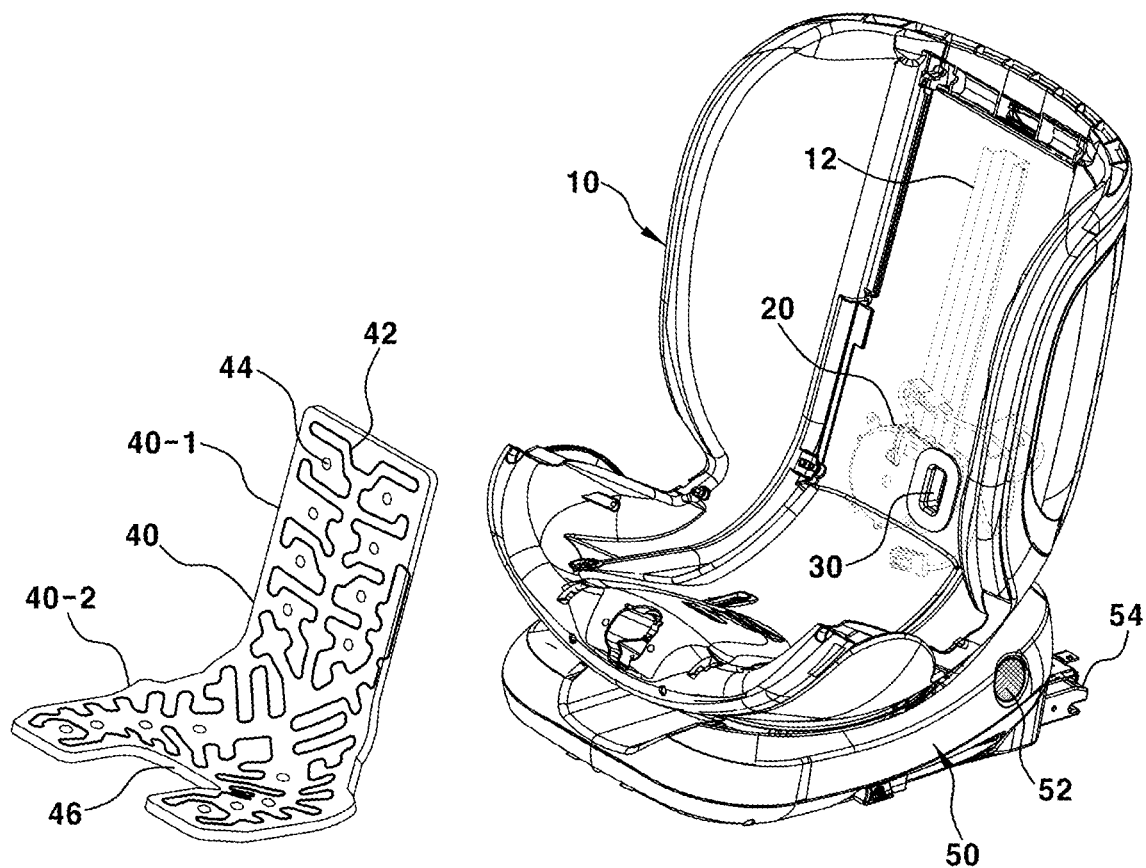
FIGS. 1A and 1B are exploded perspective views illustrating a ventilation and heating apparatus for a child seat according to the present disclosure.
Figure 1B:
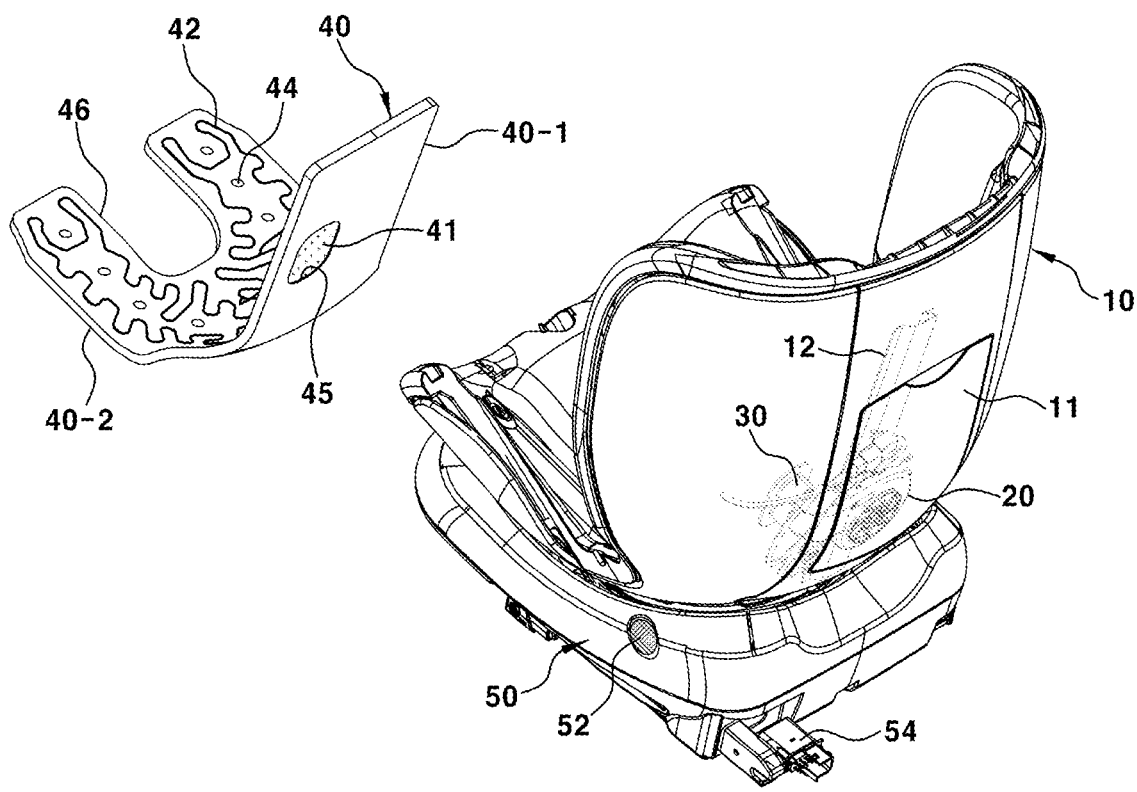
Figure 2:
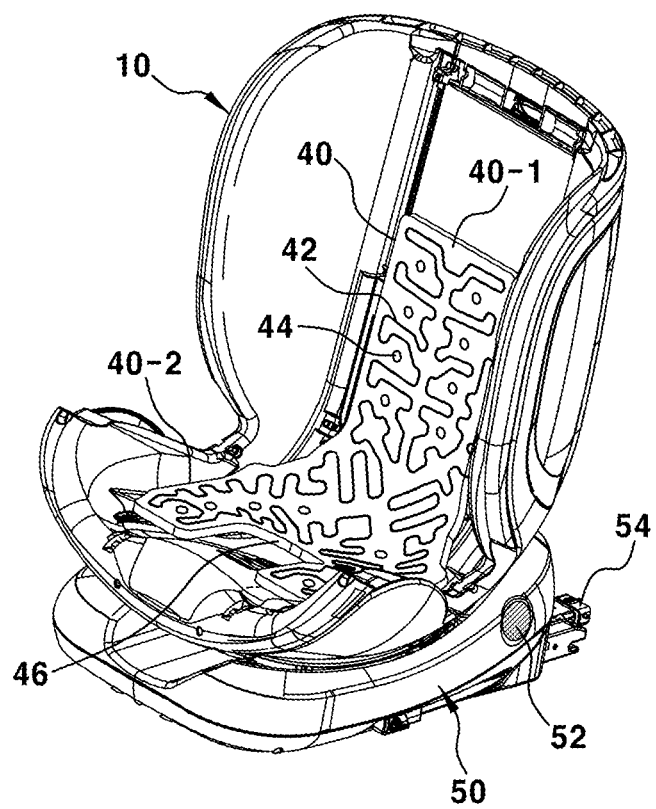
FIG. 2 is an assembled perspective view illustrating the ventilation and heating apparatus for the child seat according to the present disclosure.
Figure 3:
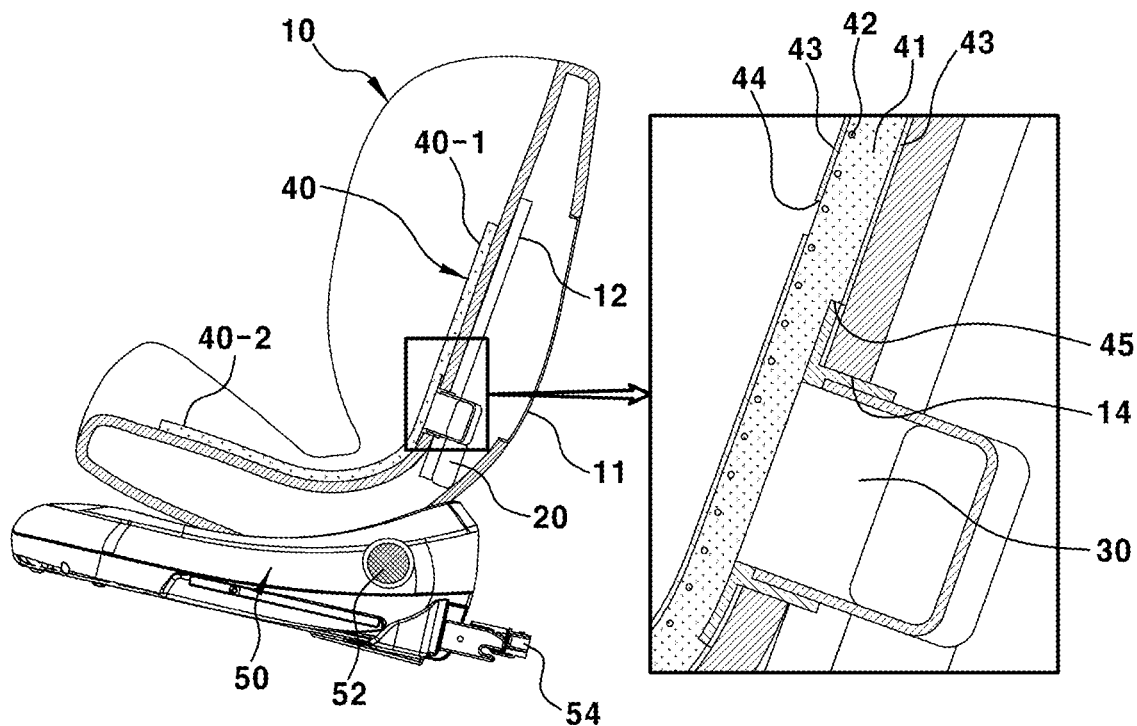
FIG. 3 is a sectional view illustrating the ventilation and heating apparatus for the child seat according to the present disclosure.

Hereinafter, a preferred embodiment of the present disclosure will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g, fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

FIGS. 1A, 1B, 2, and 3 illustrate a ventilation and heating apparatus for a child seat according to the present disclosure. In each drawing, reference numeral 10 denotes a seat body of the child seat.

The seat body 10 may be injection-molded using a plastic material in a shape that allows a child to sit thereon, and a cover plate 11 that is separately manufactured may be mounted on a rear surface of the seat body.

A ventilation mat 40 which is made of a ventilatable material and in which heating wire is embedded is attached to a front sitting portion of the seat body 10.

Figure 4:
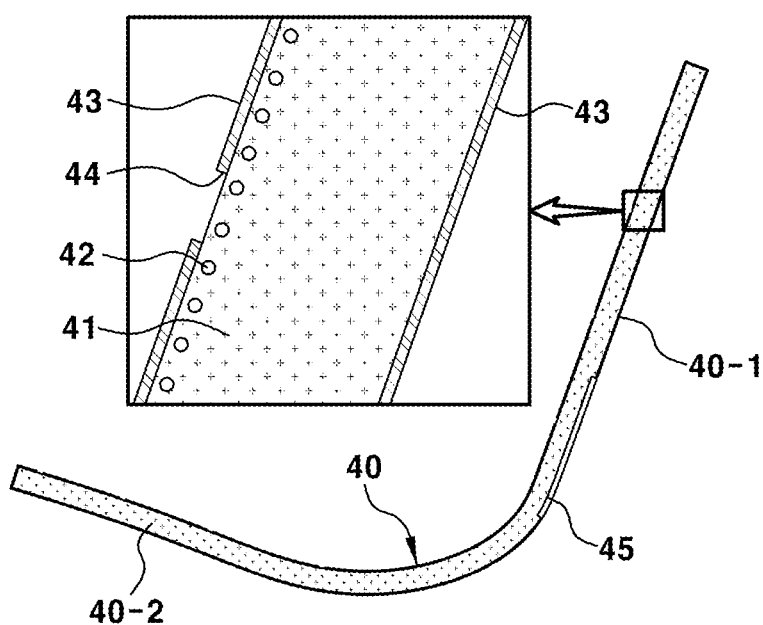
FIG. 4 is a sectional view illustrating a ventilation mat among components of the ventilation and heating apparatus for the child seat according to the present disclosure.

Particularly, as illustrated in FIG. 4, the ventilation mat 40 may include a breathable mesh material layer 41 of a predetermined thickness, a heating wire 42 embedded in a front side of the mesh material layer 41 in a predetermined arrangement, and a vinyl layer 43 coated on a surface of the mesh material layer 41 to block air flowing to the mesh material layer 41 from escaping to an outside.

Here, a plurality of air discharge holes 44 is formed through the vinyl layer 43 coated on the front portion of the mesh material layer 41, so air flowing in the mesh material layer 41 may be intensively discharged through the air discharge hole 44.

Preferably, the ventilation mat 40 is formed by integrating a back pad 40-1 with which a child's upper body is in close contact and a cushion pad 40-2 with which a child's lower body is in close contact. A buckle-avoiding cutout 46 is concavely formed in a front end of the cushion pad 40-2 of the ventilation mat 40 to avoid interference with a buckle of the child seat.

Thus, the buckle for fastening a 5-point belt for the child seat is mounted at a central position on the front end of the seat body 10. Since the buckle may be easily exposed through the buckle-avoiding cutout 46 of the cushion pad 40-2 of the ventilation mat 40, a tongue of the 5-point belt of the child seat may be easily fastened to the buckle.

A ventilation blower 20 for supplying ventilation air to the ventilation mat 40 is mounted in a back portion of the seat body 10.

Preferably, the ventilation blower 20 is fixedly mounted on a frame 12 installed in the seat body 10.

For example, in a state where the cover plate 11 mounted on the rear portion of the seat body is opened, the ventilation blower 20 may be introduced into the seat body 10, and then the frame 12 may be mounted on the ventilation blower 20.

At this time, a duct support hole 14 through which a duct 30 connected to a discharge part of the ventilation blower 20 passes is formed in a predetermined position on the front portion of the seat body 10.

Further, a duct fastening groove 45 to which the front end of the duct 30 is fastened is formed in the rear portion of the ventilation mat 40.

Thus, after the duct 30 connected to the discharge part of the ventilation blower 20 passes through the duct support hole 14 of the seat body 10, the front end of the passing duct 30 is air-tightly inserted and fastened to the duct fastening groove 45 formed in the rear portion of the ventilation mat 40, so blowing air caused by the driving of the ventilation blower 20 may be easily supplied along the duct 30 to the ventilation mat 40.

A base plate 50 which is configured to be seated on the rear seat and to make the inside of the seat body 10 and outdoor air communicate with each other is mounted on the bottom of the seat body 10.

In detail, the base plate 50 has an opening formed thereon to mount mechanism components for swiveling and reclining the seat body 10. Further, the bottom of the base plate 50 is formed as a flat surface to be seated on the rear seat, and a grill 52 is formed on a side of the base plate to draw outdoor air.

Further, an opening is formed on the bottom of the seat body 10 to mount mechanism components for swiveling and reclining, thus allowing the interior of the base plate 50 to communicate with the interior of the seat body 10.

Thus, when the ventilation blower 20 is driven, outdoor air is sucked through the grill 52 of the base plate 50 to easily flow to an intake side of the ventilation blower 20 in the seat body 10, thus allowing the air intake and blowing operation of the ventilation blower 20 to be efficiently performed.

A connector 54 connected to a power supply so as to supply power to the heating wire 42 and the ventilation blower 20 is mounted on the rear end of the base plate 50.

Further, although a switch for turning on and off the heating wire 42 and the ventilation blower 20 is not shown, the switch may be installed at a predetermined position of the child seat.

Here, the operation flow for the ventilation and heating apparatus for the child seat according to the present disclosure configured as described above is as follows.

Figure 5:
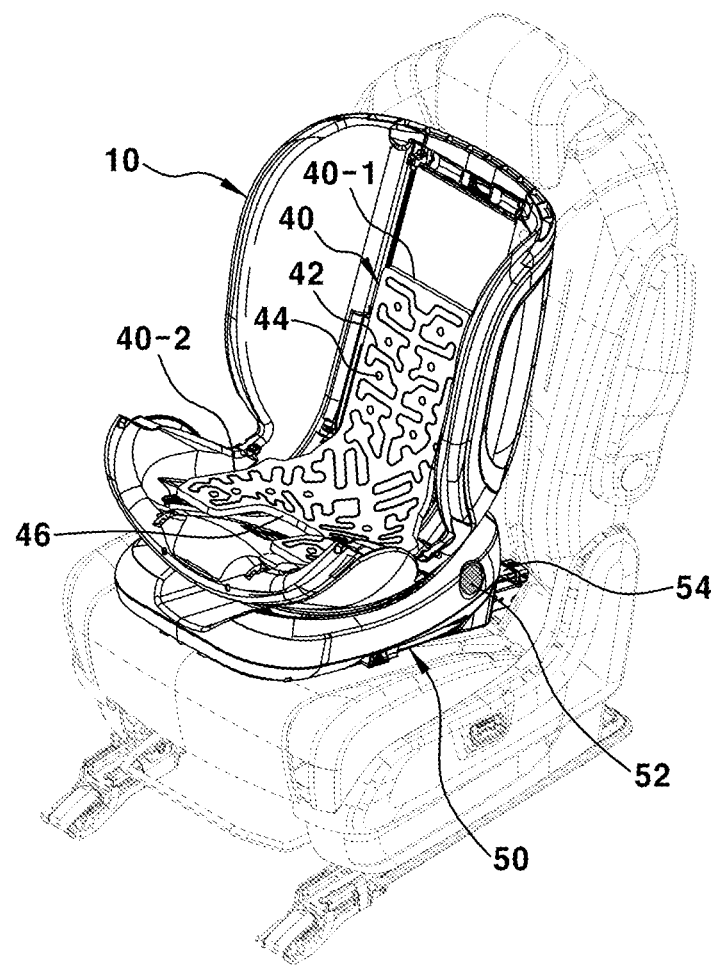
FIG. 5 is a perspective view illustrating a state in which the child seat having the ventilation and heating apparatus according to the present disclosure is seated on a rear seat for a vehicle.
Figure 6:
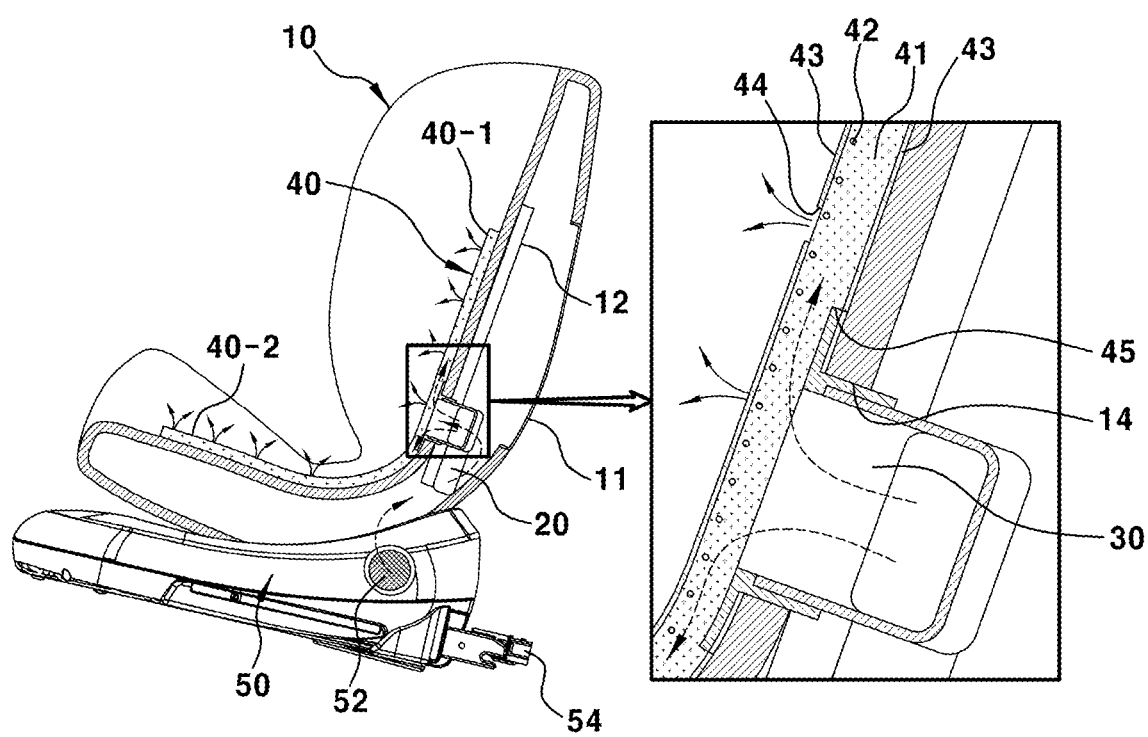
FIG. 6 is a sectional view illustrating the operating state of the ventilation and heating apparatus for the child seat according to the present disclosure.

FIG. 5 is a perspective view illustrating a state in which the child seat having the ventilation and heating apparatus according to the present disclosure is seated on the rear seat for the vehicle, and FIG. 6 is a sectional view illustrating the operating state of the ventilation and heating apparatus for the child seat according to the present disclosure.

The child seat having the ventilation and heating apparatus according to the present disclosure is fixedly seated on the rear seat of the vehicle.

In other words, when the base plate 50 is seated and fixed on the rear seat, the seat body 10 is disposed in a state where a child may sit.

When the child sits on the seat body 10, the child's upper body may be in close contact with the back pad 40-1 of the ventilation mat 40, and the child's lower body may be in close contact with the cushion pad 40-2 of the ventilation mat 40.

In this case, in summer, the child may feel hot or feel discomfort such as sweating due to a long ride.

In order to solve this problem, the ventilation blower 20 in the seat body 10 is driven. Then, outdoor air is sucked through the grill 52 of the base plate 50 and flows to the intake side of the ventilation blower 20, and the sucked air is blown to the ventilation mat 40 through the discharge part of the ventilation blower 20.

In more detail, after the blowing air generated by the driving of the ventilation blower 20 is supplied and diffused to the mesh material layer 41 of the ventilation mat 40 along the duct 30, the air flowing in the mesh material layer 41 may be intensively discharged through a plurality of air discharge holes 44 formed in the vinyl layer 43.

At this time, the blowing air flowing to the mesh material layer 41 is not discharged to the outside by the vinyl layer 43, but is intensively discharged through the plurality of air discharge holes 44 formed in the vinyl layer 43, thus allowing the ventilation air to intensively act on the child's body.

As such, in summer or when ventilation is required, ventilation air is discharged toward a child's body through the ventilation mat 40, thus resolving discomfort such as sweating or feeling hot and thereby providing a pleasant seating environment for the child.

In winter, a child sitting on the child seat may feel cold.

In order to solve this problem, the heating wire 42 embedded in the ventilation mat 40 may be driven, so it is possible to resolve the discomfort of the child sitting on the child seat, such as feeling cold, thus providing a comfortable seating environment for the child.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A ventilation and heating apparatus for a child seat, the apparatus comprising:
   a seat body made in a shape that allows a child to sit thereon;
   a ventilation mat made of a structure in which a heating wire is embedded in a ventilatable material, and configured to be attached to a sitting portion of the seat body; and
   a ventilation blower installed in the seat body to supply ventilation air to the ventilation mat;
   wherein a base plate, configured to make an inside of the seat body and outdoor air communicate with each other, is mounted on a bottom of the seat body; and
   wherein the base plate has an opening formed thereon to mount mechanism components for swiveling and reclining the seat body.

2. The ventilation and heating apparatus of claim 1, wherein the ventilation mat comprises:
   a breathable mesh material layer of a predetermined thickness;
   a heating wire embedded in a front of the mesh material layer in a predetermined arrangement; and
   a vinyl layer coated on a surface of the mesh material layer.

3. The ventilation and heating apparatus of claim 2, wherein a plurality of air discharge holes is formed in the vinyl layer coated on a front portion of the mesh material layer.

4. The ventilation and heating apparatus of claim 1, wherein the ventilation mat is formed by integrating a back pad with which a child's upper body is in close contact and a cushion pad with which a child's lower body is in close contact.

5. The ventilation and heating apparatus of claim 4, wherein a buckle-avoiding cutout is formed in a front end of the cushion pad of the ventilation mat to avoid interference with a buckle of the child seat.

6. The ventilation and heating apparatus of claim 5, wherein the buckle-avoiding cutout is concavely formed in the front end of the cushion pad of the ventilation mat.

7. The ventilation and heating apparatus of claim 1, wherein a duct is connected between a rear portion of the ventilation mat and the ventilation blower to deliver air from the ventilation blower to the ventilation mat.

8. The ventilation and heating apparatus of claim 7, wherein a duct fastening groove is formed in a rear portion of the ventilation mat.

9. The ventilation and heating apparatus of claim 7, wherein a duct support hole through which the duct connected to a discharge part of the ventilation blower passes is formed in a predetermined position on a front portion of the seat body.

10. The ventilation and heating apparatus of claim 1, wherein a grill is formed on a side of the base plate to draw outdoor air.

11. The ventilation and heating apparatus of claim 10, wherein a connector connected to a power supply so as to supply power to the heating wire and the ventilation blower is mounted on a rear end of the base plate.

12. The ventilation and heating apparatus of claim 1, wherein the ventilation blower is fixedly mounted on a frame installed in the seat body.

13. The ventilation and heating apparatus of claim 1, wherein a cover plate is mounted on a rear surface of the seat body.

14. The ventilation and heating apparatus of claim 1, wherein the seat body is injection-molded using a plastic material.

15. A vehicle comprising the ventilation and heating apparatus of claim 1.

16. The vehicle of claim 15, wherein the apparatus is fixed on a rear seat of the vehicle.

* * * * *